(12) United States Patent
Carpenter (10) Patent No.: US 10,549,798 B2
(45) Date of Patent: Feb. 4, 2020

(54) VEHICLE TRACK CLEANER

(71) Applicant: Adam Carpenter, Coldwater, MI (US)

(72) Inventor: Adam Carpenter, Coldwater, MI (US)

( * ) Notice: Subject to any disclaimer, the term of this patent is extended or adjusted under 35 U.S.C. 154(b) by 595 days.

(21) Appl. No.: 15/229,453

(22) Filed: Aug. 5, 2016

(65) Prior Publication Data

US 2018/0037279 A1 Feb. 8, 2018

(51) Int. Cl.
*B62D 55/088* (2006.01)

(52) U.S. Cl.
CPC ....... *B62D 55/0882* (2013.01); *B62D 55/088* (2013.01)

(58) Field of Classification Search
CPC .............................. B62D 55/088; B62D 55/0882
USPC .......................................................... 305/107
See application file for complete search history.

(56) References Cited

U.S. PATENT DOCUMENTS

| 2,982,584 | A | * | 5/1961 | Uemura | B62D 55/0882 305/107 |
| 5,863,104 | A | * | 1/1999 | Satzler | B62D 55/088 305/107 |
| 8,827,382 | B1 | * | 9/2014 | Jeffs | B62D 55/26 305/108 |
| 2008/0150355 | A1 | * | 6/2008 | Breton | B62D 55/088 305/107 |
| 2011/0025122 | A1 | * | 2/2011 | Tan | B60S 1/66 305/107 |
| 2017/0129554 | A1 | * | 5/2017 | Conover | B62D 55/0882 |

* cited by examiner

*Primary Examiner* — Scott A Browne
(74) *Attorney, Agent, or Firm* — Barrett McNagny

(57) ABSTRACT

A device for cleaning the tracks of a track-driven vehicle comprising a mounting plate, at least one positioning arm connected to and extending from the mounting plate, and at least one brush assembly attached to and extending from a positioning arm, where the mounting plate, positioning arm, and brush assembly are configured so that when the mounting plate is mounted to a vehicle the brush is positioned to clean the track of the vehicle.

12 Claims, 10 Drawing Sheets

VEHICLE TRACK CLEANER

CROSS REFERENCE TO PRIOR APPLICATIONS

N/A

STATEMENT OF GOVERNMENT FUNDING

N/A

BACKGROUND

The present invention relates generally to a device for cleaning dirt, mud, snow, sand, rocks, and other debris from the tracks of a track-driven vehicle, substantially continuously, while the vehicle is in use. Track-driven vehicles are known to the art for use in a variety of applications. Common track-driven vehicles include skid steers, loaders, backhoes, tractors, roadworks machines, snow machines, bulldozers, and military vehicles.

One advantage of track-driven vehicles compared to wheeled vehicles is that the tracks distribute the weight of the vehicle over a substantially larger surface area than pneumatic tires. As a result, track-driven vehicles enjoy substantially better traction in off-road conditions such as dirt, mud, snow, sand, or rocky terrain than wheeled vehicles using pneumatic tires. This is especially true for vehicles with a high overall weight or vehicles that are intended to push, pull, or haul heavy weight off-road, where track drive becomes particularly advantageous. Vehicles that are purpose-built for heavy operation off-road, such as, for example, bulldozers and snow machines, generally employ a track drive to take advantage of the superior traction characteristics and weight distribution.

Track-driven vehicles are, however, not without disadvantages. The tracks of track drives are generally in a belt-like configuration, and can be passively driven or can be active. Tracks often include a plurality of ridges or protrusions to improve traction. In some conditions, such as loose dirt, mud, sand, snow, or loose gravel or rock, the track can become dirty and clogged. For illustrative example, a bulldozer operating in mud may in certain conditions see its track become packed with mud such that the mud fills up the entirety of each of the spaces between the track's traction ridges. Until the mud is cleaned from the track the mud creates an effectively flat, smooth, slippery track surface instead of a ridged or contoured one. This dramatically reduces vehicle traction and can result in the track-driven vehicle becoming stuck or unable to push, pull, or haul as desired.

It is known to the art to overcome this problem by stopping the vehicle and manually cleaning the tracks. This is a time consuming solution. Moreover, the tracks generally quickly become clogged again with continued use, requiring the user to again stop and engage in a time-consuming track-cleaning task. Repeatedly manually cleaning the tracks renders many intended uses of the vehicle impractical, as the user would spend more time cleaning the tracks than performing the intended task. Another solution known to the art is in increase the width of the track, increasing its surface area and thus its traction capabilities so that the tracks provide the desired performance even when clogged with dirt, mud, snow, sand, rocks, or other debris. This solution typically requires replacement of either the tracks or the whole track-drive system of the vehicle, or, in some cases, replacement of the entire vehicle. In all cases this solution imposes meaningful cost and inconvenience on the user.

What is needed is a means to clean dirt, mud, snow, sand, rocks, or other debris from the tracks of a track-driven vehicle sufficiently to restore traction while the vehicle is in use in dirty, muddy, snowy, sandy, rocky, or other potentially clogging conditions, without requiring the user to stop the vehicle to perform a cleaning operation and without requiring the purchase of a vehicle with wider tracks.

SUMMARY

The present invention, in its various embodiments, comprises a device for continuously cleaning dirt, mud, snow, sand, rocks, or other clogging materials from the tracks of a track-driven vehicle, while the vehicle is in use, and particularly while the vehicle is in use in dirty, muddy, snowy, sandy, rocky, or adverse conditions. In general, embodiments of the present invention comprise a mounting plate, at least one positioning arm extending from the mounting plate, and at least one brush connected to the positioning arm.

DETAILED DESCRIPTION

Figure 1:
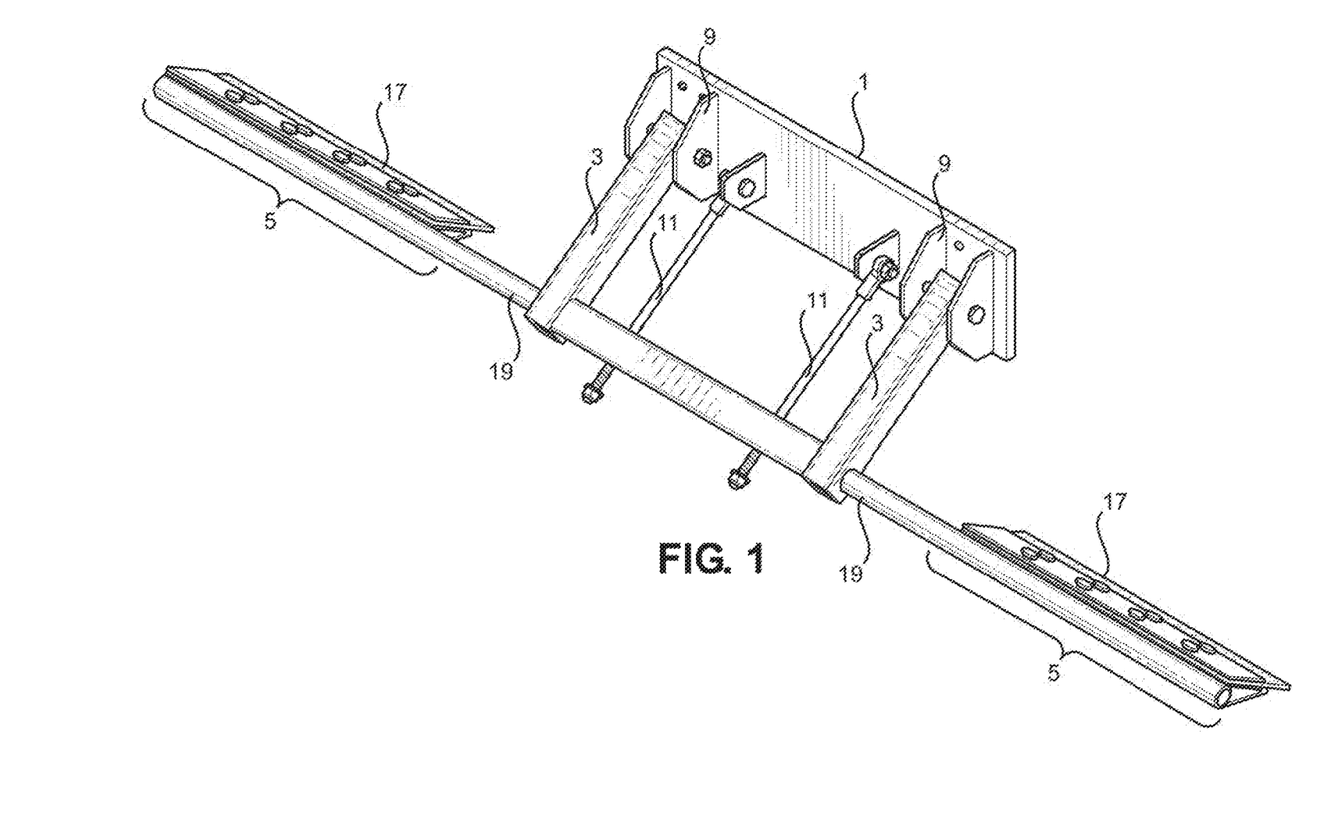
FIG. 1 shows a perspective view of a preferred embodiment of the present invention.

A mounting plate 1 according to embodiments of the present invention composes a plate, bracket, or other structure adapted for mechanical connection to a track-driven vehicle. Although a variety of mounting plate 1 configurations, shapes, and sizes may be used within the scope and spirit of the invention, the mounting plate 1 is preferably generally rectangular, as shown in FIG. 1. A variety of mechanical connections may be used to mount the mounting plate to a track-driven vehicle. Welds, screws, bolts, or various other mechanical connections may all be used, as will be appreciated by one skilled in the art. Preferably, the mounting plate 1 is pre-drilled with holes configured to cooperate with pre-existing multi-purpose mounting holes in the tracked vehicle on which it is intended to be mounted, such as mounting holes for interchangeable vehicle attachments. Most preferably, the vehicle is a bulldozer, and the mounting plate 1 is pre-drilled with holes configured to cooperate with the bulldozer's existing mounting holes for a ripper or winch attachment. In these preferred embodiments, the mounting plate 1 is connected to the tracked vehicle using bolts or other mechanical connectors that interface with the cooperating mounting holes of the mounting plate 1 and the vehicle. As will be appreciated by one skilled in the art, a mounting plate 1 within the scope and spirit of this invention may also employ any of a variety of other mechanical attachment means commonly used to connect removable attachments to vehicles.

Figure 2:
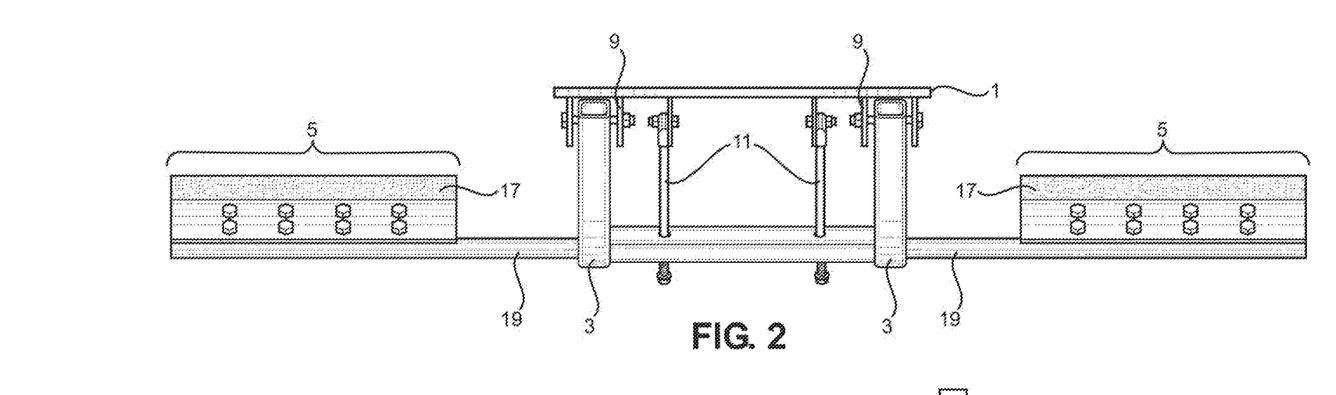
FIG. 2 shows a top-down view of a preferred embodiment of the present invention.
Figure 3:
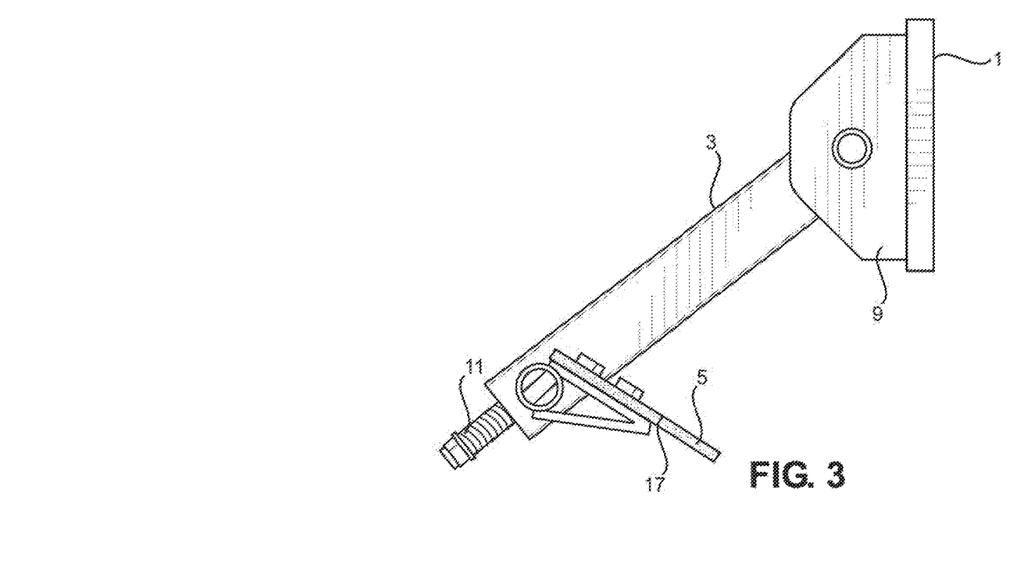
FIG. 3 shows a side elevation view of a preferred embodiment of the present invention.

Devices of the present invention further comprise at least one positioning arm 3 extending from and connected to the mounting plate 1. The at least one positioning arm 3 extends outwardly from the mounting plate 1 at an angle and length adapted to position at least one brush 5 at an appropriate location to engage vehicle tracks 7 for cleaning. The at least one positioning arm 3 can be connected to the mounting plate 1 by use of intermediate structures such as brackets 9, as shown in FIGS. 1-3. The positioning arm 1 may alternatively be connected directly such as by welding or bolting, or can be integral to the mounting plate 1, as shown in FIGS. 4-9.

In a preferred embodiment, as shown in FIGS. 1-3, there are at least two positioning arms 3, and each positioning arm 3 is adjustably connected to the mounting plate 1 by connection to a bracket 9 connected to the mounting plate 1. In this preferred embodiment, each face of the bracket 9 contains an inline bolt hole, which cooperates with a similarly-sized bolt hole through each side of a first end of each positioning arm 3 such that when a bolt or pin is passed through the bolt hole in one face of the bracket 9, then each side of a first end of each positioning arm 3, then the opposite face of the bracket 9, each positioning arm 3 is securely and pivotally connected to the mounting plate 1 so that the second end of each positioning arm 3 is adjustable with respect to the mounting plate 1.

In this embodiment, one or more of the brackets 9 may include stops, ratchets, or other locking means to lock the pivotal rotation of one or more positioning arms 3 at desired heights or positions. Preferably, as shown in FIGS. 1-3, no positioning arm 3 is locked into position with respect to the mounting plate 1 and the device further comprises one or more biasing elements 11 to bias the second end of each positioning arm downwards. Herein, "down" or "downwards" shall mean generally in the direction of a vehicle's track when the device is mounted on a track-driven vehicle.

In alternate embodiments, as shown in FIGS. 4-9, at least one positioning arm 3 is connected to the mounting plate 1 by welding or other permanent connection, or is integral to the mounting plate 1. In these alternate embodiment, the location of the second end of each positioning arm is fixed with respect to the mounting plate 1.

Embodiments of the present invention may utilize one, two, three, or more positioning arms 3 connected to the mounting plate 1. As will be apparent to one skilled in the art, when multiple positioning arms 3 are used, the positioning arms 3 must be configured and positioned to locate each brush 5 in the desired location with respect to a vehicle track 7. In preferred embodiments, the device comprises two positioning arms 3 of equal length and of similar orientation with respect to the mounting plate 1.

In embodiments of the present invention with two or more positioning arms 3, the device may further comprise one or more connecting members 15 connecting the second ends of each positioning arm 3 to each other. Such connecting members 15 aid in the rigidity and durability of the device, in assisting the positioning arms 3 in cooperating with each other, and in keeping brushes 5 at desired heights and orientations.

As shown in FIGS. 4-9, the present invention may in some embodiments include support members 13 to provide mechanical support and additional rigidity to the positioning arms 3 and at least one brush 5. Such support members 13 may directly connect the mounting plate 1 to the area of the second end of a positioning arm 3. Alternatively or optionally, such support members 13 may connect one or more connecting members 15 directly to the mounting plate 1. Such support members 13 may be welded, may be integral to one or more of the positioning arm 3, connecting member 15, or mounting plate 1, or may be attached to one or more of the above by a variety of mechanical connectors, as will be appreciated by one skilled in the art.

Figure 6:
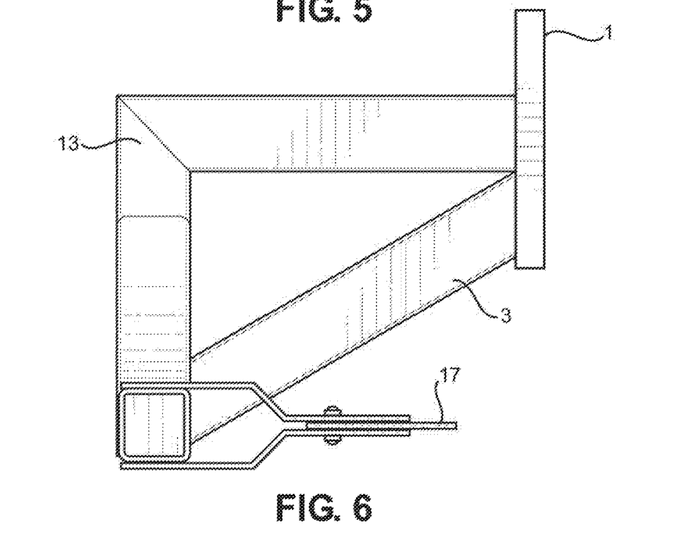
FIG. 6 shows a side elevation view of an alternative embodiment of the present invention.
Figure 7:
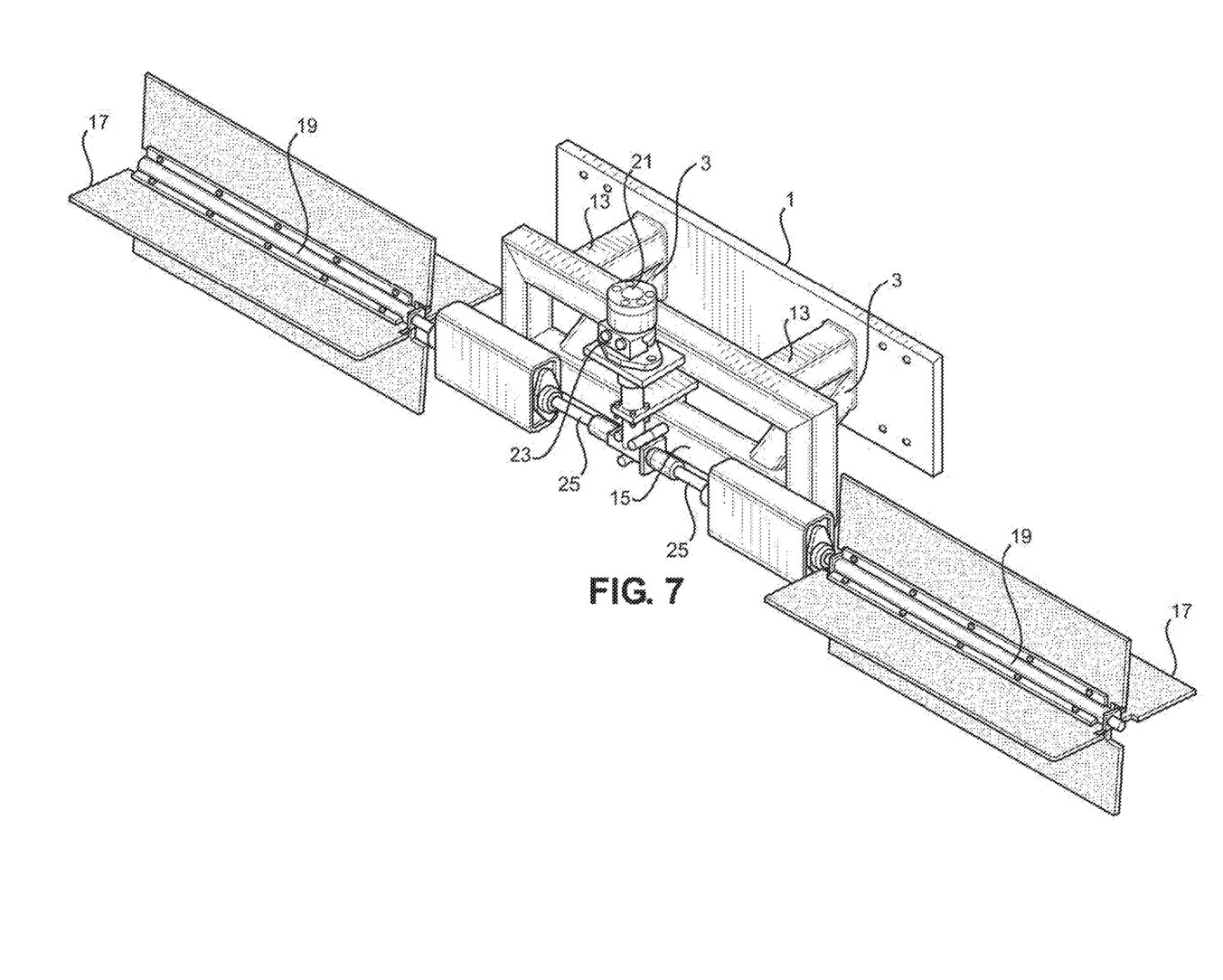
FIG. 7 shows a perspective view of an alternative hydraulic embodiment of the present invention.
Figure 8:
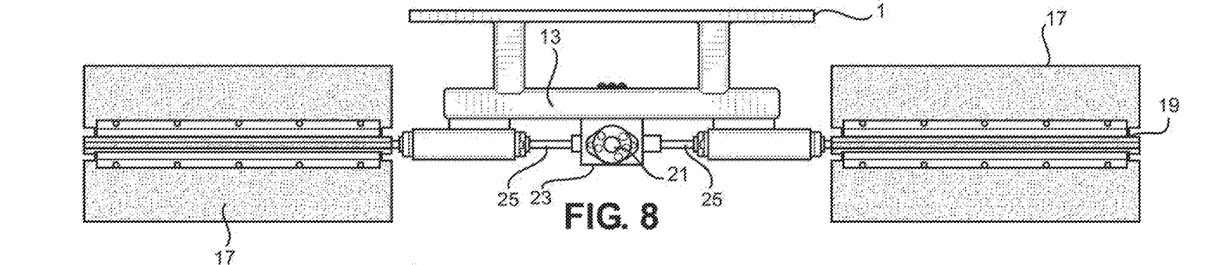
FIG. 8 shows a top-down view of an alternative hydraulic embodiment of the present invention.
Figure 9:
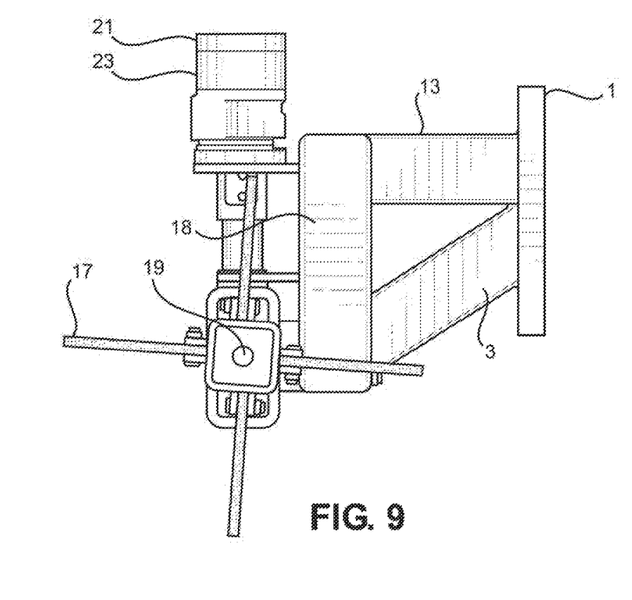
FIG. 9 shows a side elevation view of an alternative hydraulic embodiment of the present invention.
Figure 10:
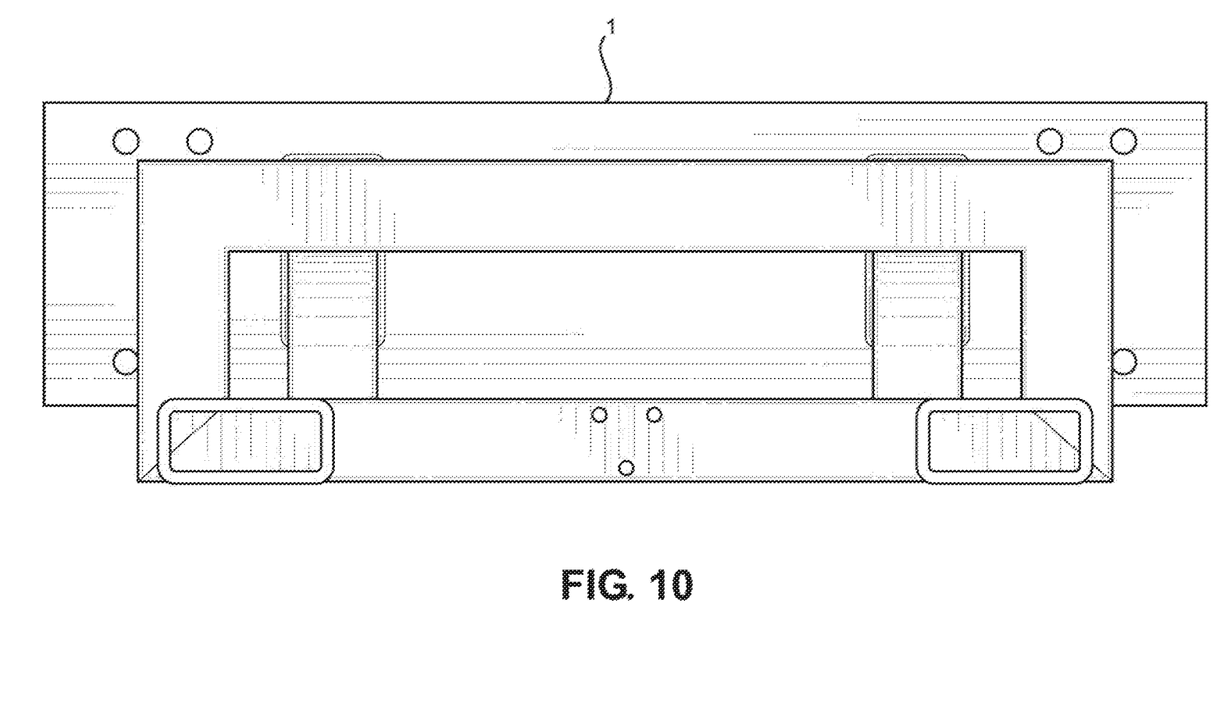
FIG. 10 shows a front view of a mounting plate of a preferred embodiment of the present invention.

Embodiments of the present invention further comprise at least one brush 5. A brush 5 according to the present invention includes a cleaning member 17 and a base member 19. The base member 19 comprises a rod, beam, or other member with a longitudinal axis. In most embodiments herein, a base member 19 is connected at its first end to a positioning arm 3, connecting member 15, or support member 13, and at its second end to a cleaning member 17, as shown in each of FIGS. 1-9. The base member 19 may be connected by welding, by a variety of mechanical connectors like bolts, or may be integral to one or more of the positioning arm 3, connecting member 15, or support member 13, as will be appreciated by one skilled in the art. The base member 19 may further, as shown in FIGS. 7-9, be operatively rotatably connected to a hydraulic drive assembly 21.

At least one cleaning member 17 is attached to each base member 19. Each cleaning member 17 can be any surface configured and adapted to scrape dirt, mud, snow, sand, rocks, or other debris off of a track when the track-driven vehicle is in motion or the track is otherwise moving with respect to the brush 5. The cleaning member 17 may, by way of illustrative example, comprise a rubber pad, a bristle brush, or a metal scraper. Other appropriate materials will be apparent to one skilled in the art. Preferably, the cleaning member 17 is a rubber pad.

Each brush 5 comprises at least one cleaning member 17. In a preferred embodiment, each brush 5 comprises a single cleaning member 17. In alternate embodiments, each brush 5 may comprise multiple cleaning members 17. For example, in the alternate embodiment shown in FIGS. 7-9, each brush 5 comprises four cleaning members 17. Each cleaning member 17 may individually comprise multiple surfaces or layers contacting the vehicle track, such as multiple rubber pads or a single rubber pad split along one edge to form multiple layers at the point of contact with the vehicle track.

The cleaning member 17 is connected to the base member 19 in the area of the base member's second end and extends generally away from its longitudinal axis. The cleaning member 17 is preferably connected to the base member 19 by detachable mechanical connectors, facilitating the replacement of the cleaning member 17 if the cleaning member 17 becomes abraded or worn from use. The attachment of the cleaning member 17 to the base member 19 may further comprise mechanical supports or struts to aid in holding the cleaning member 17 in position with respect to the base member 19 and the vehicle track 7.

Figure 11:
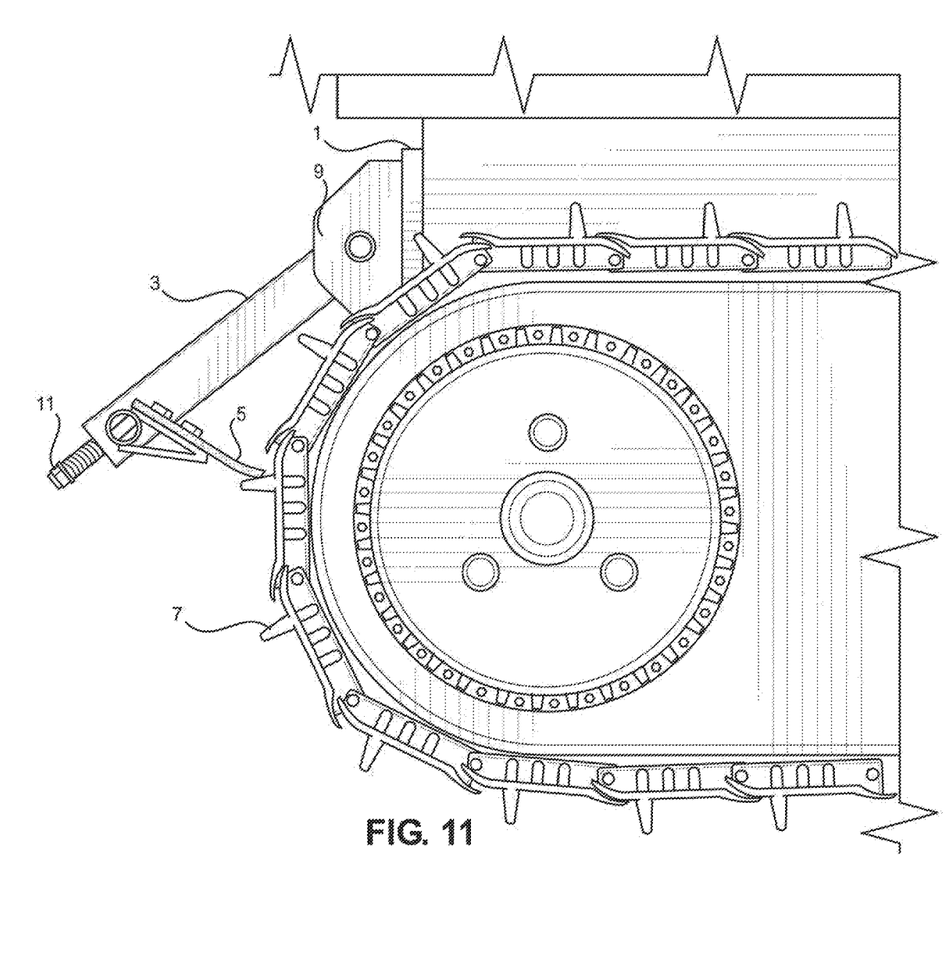
FIG. 11 shows a side view of a preferred embodiment of the present invention mounted to a track-driven vehicle.
Figure 12:
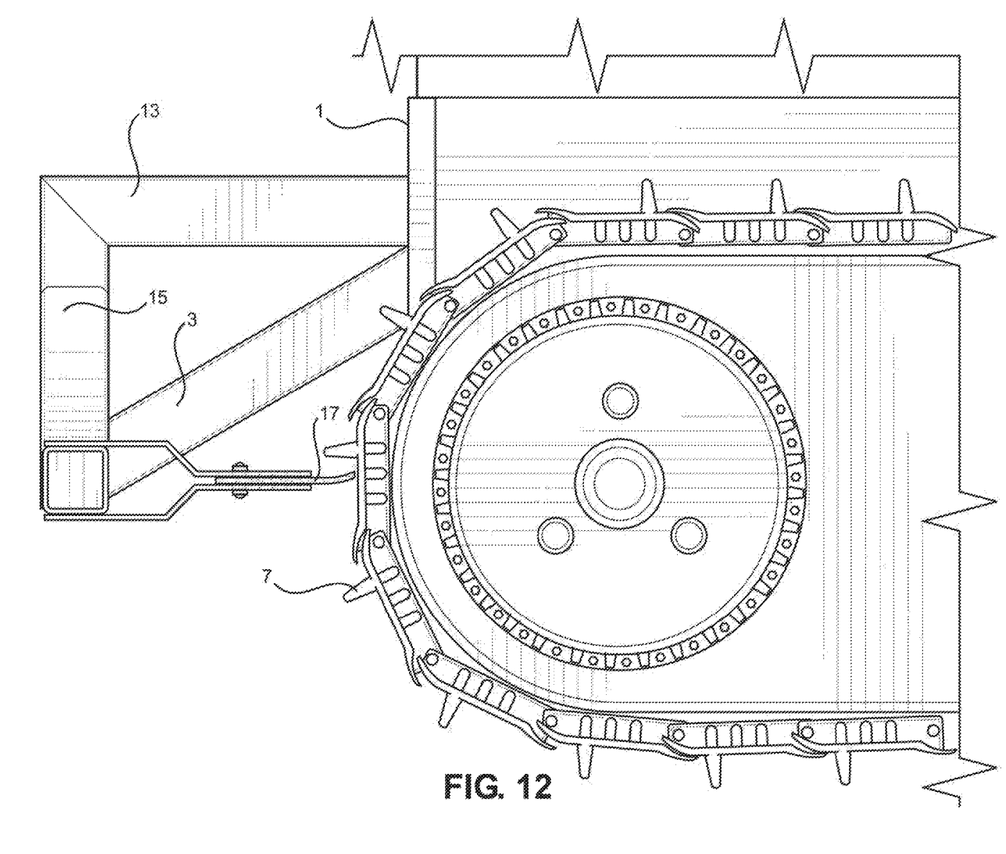
FIG. 12 shows a diagrammatic view demonstrating the cleaning action of a preferred embodiment of the present invention mounted to a track-driven vehicle.

In the preferred embodiment show in FIGS. 1-3, the device comprises two brushes 5 extending in opposite directions from each other, transversely to each of the two positioning arms 3. In this preferred embodiment, the base member 19 of each brush 5 is a metal rod of tube that connects by insertion into a cooperatively-shaped aperture in the second end of a positioning arm 3. Each base member 19 in this preferred embodiment is secured to a positioning arm 3 by welding. Each base member 19 in this embodiment extends from the positioning arm 3 to which it is attached a distance selected to position the edge of a cleaning member 17 substantially across the width of one track of the track-driven vehicle to which the device is mounted or intended to be mounted, as shown in FIG. 11. Each cleaning member 17 is further connected to each base member 19 by removable mechanical connectors at an angle configured to provide contact between the cleaning member 17 and the track and also to optimize the cleaning action of the cleaning member 17 when the track rotates in use.

In an alternate embodiment shown in FIGS. 7-9, the device comprises a mounting plate 1, two positioning arms 3 rigidly attached to the mounting plate 1, a rectangular connecting member 15 rigidly connected to each of the positioning arms along the connecting member's lower member, and two support members 13 rigidly connected at one end to the mounting plate 1 and at the other end to the upper member of the rectangular connecting member 15. Further attached to the connecting member 15 is a drive means 21 comprising a drive 23 and two drive axles 25 rotatably operatively connected to the drive 23 and extending transversely and in opposite directions from the 23. The drive means 21 may be a hydraulic, electric, pneumatic, or combustion-drive, as will be appreciated by one skilled in the art. In this embodiment, a brush 5 is operatively connected to each drive axle 25. Each base member 19 is configured to position the cleaning members 17 substantially across the width of one track of the track-driven vehicle to which the device is mounted or intended to be mounted. Each brush 5 in this embodiment comprises four cleaning members 17, although, as would be understood by one skilled in the art, a lesser or greater number of cleaning members could be used within the scope and spirit of this invention.

Figure 4:
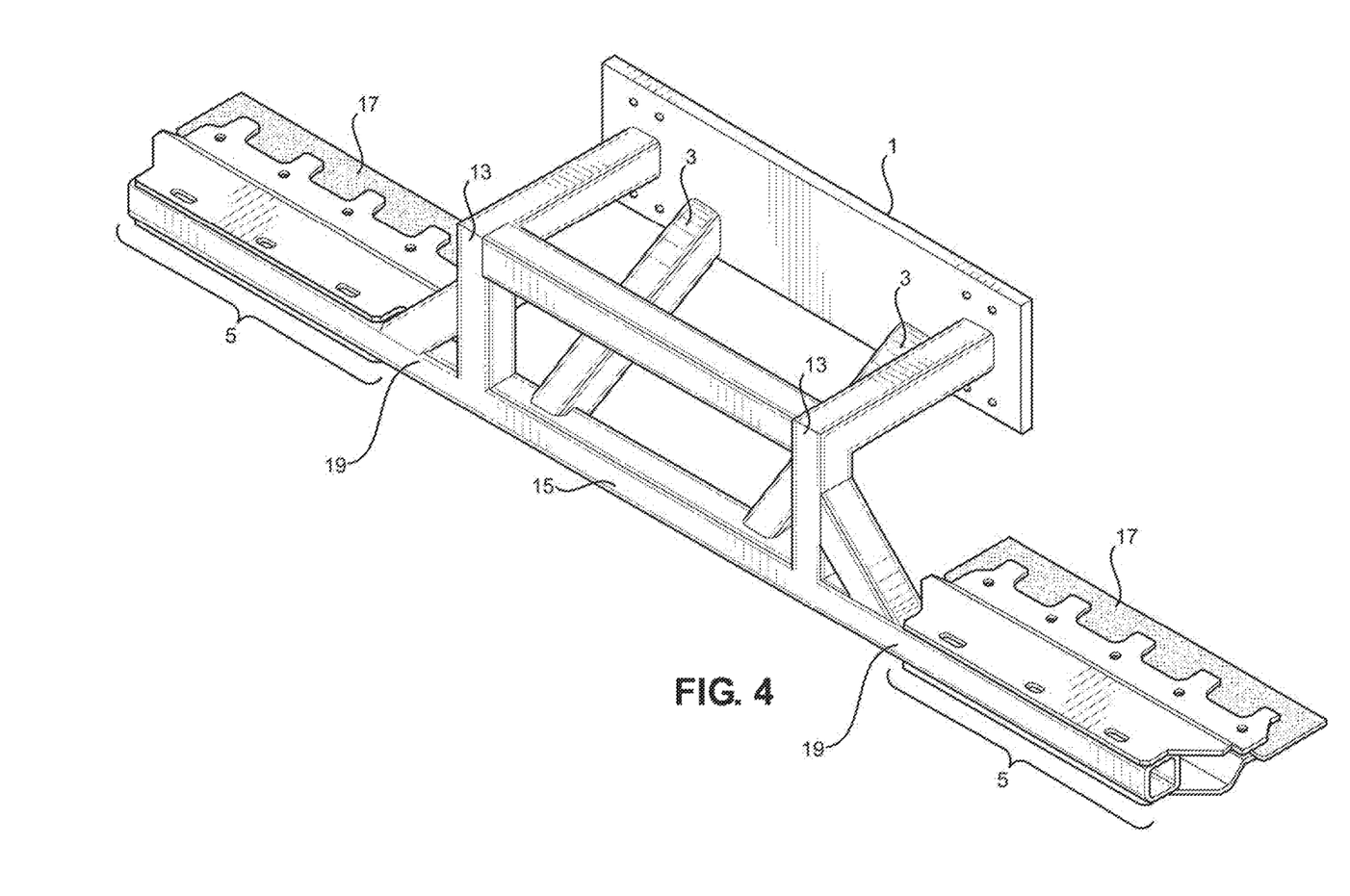
FIG. 4 shows a perspective view of an alternative embodiment of the present invention.
Figure 5:
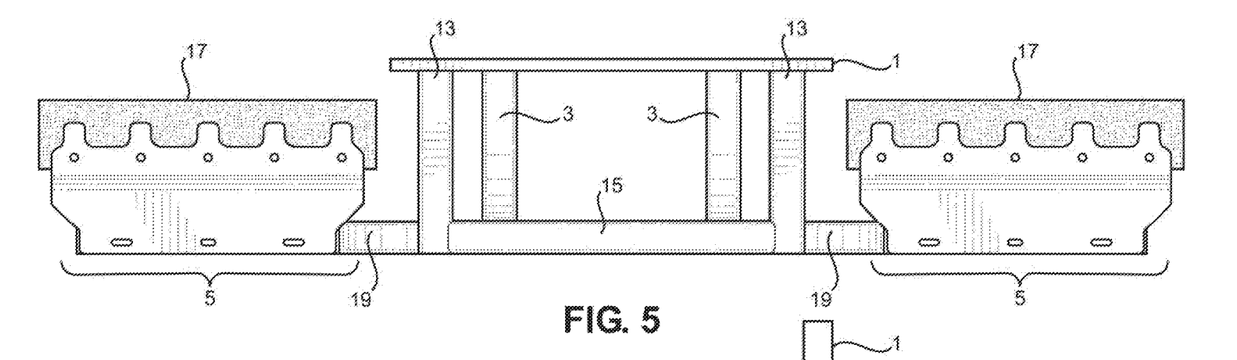
FIG. 5 shows a top-down view of an alternative embodiment of the present invention.
Figure 13:
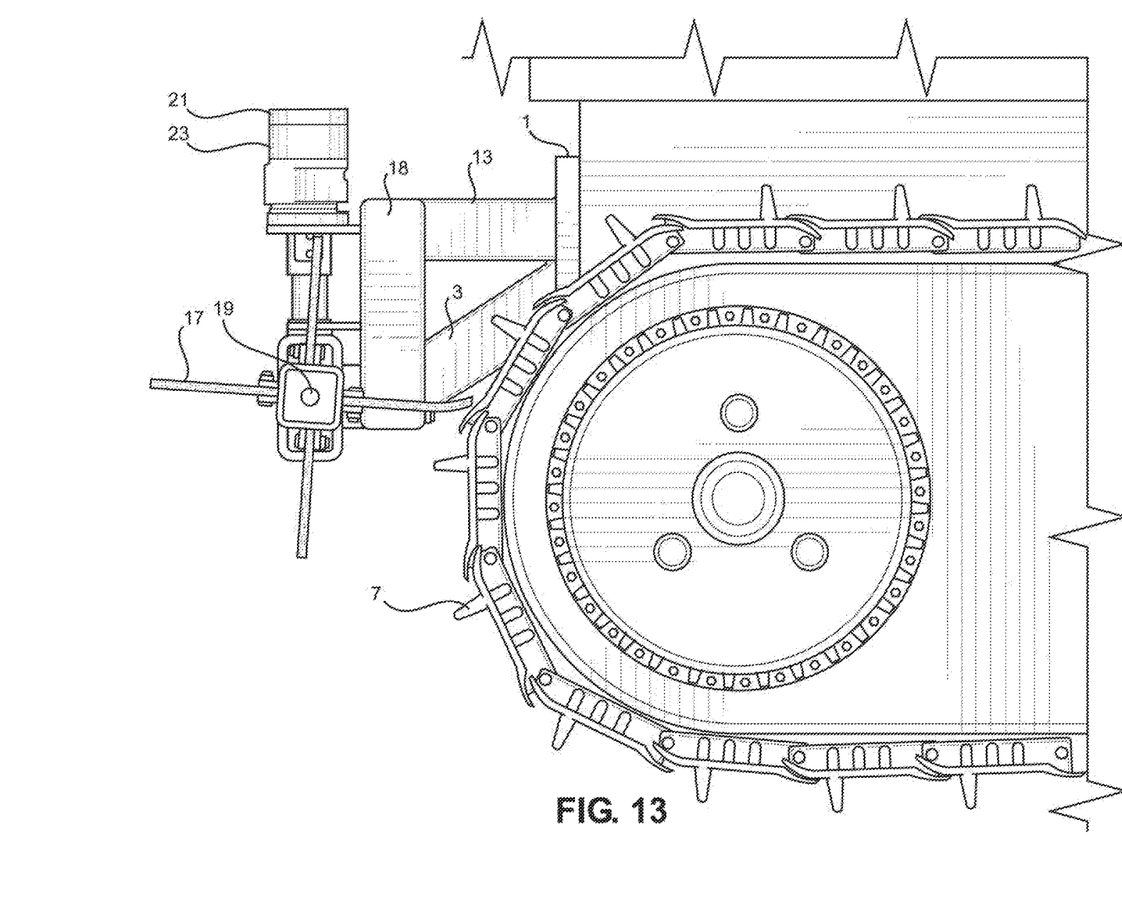
FIG. 13 shows a diagrammatic view demonstrating the cleaning action of a hydraulic alternate embodiment of the present invention mounted to a track-driven vehicle.

In operation, embodiments of the present invention function by disposing and holding the edge of a cleaning member 17 substantially across the width of a track 7 such that when the vehicle moves by rotation of the track 1, the track 7 is in frictional contact with the edge of a cleaning member 17 and the cleaning member 17 cleans dirt, mud, sand, snow, rocks, or other debris from the track 7. In this way, the track 7 is continually being cleaned while the vehicle is in use and disadvantageous clogging of the track 7 is avoided. In a preferred embodiment, as shown in FIGS. 1-3, the brushes 5 are rigidly attached to the positioning arms 3 and the positioning arms 3 are adjustable with respect to the mounting plate 1 and biased towards the vehicle track by one or more biasing elements 11 to achieve the desired level of friction between each cleaning member 17 and a track 7. In an alternate embodiment, as shown in FIGS. 4-6, the positioning arms 3 are rigidly connected to the mounting plate with an angle and length configured to position each brush 5 substantially across the width of a track. In a still alternate embodiment shown in FIGS. 7-9, the positioning arms 3 are rigidly connected to the mounting plate with an angle and length configured to position each brush 5 substantially across the width of a track, and each brush further contains multiple cleaning elements 17 that rotate under power from a hydraulic drive assembly 21, as shown in FIG. 13, assisting in the cleaning action of each brush 5.

In each embodiment, the degree of contact and friction between each cleaning member 17 and a track can optionally be controlled by adjusting the distance each cleaning member 17 extends from its base member 19. This adjustment can be achieved by repositioning of the cleaning member 17 with respect to the longitudinal axis of its base member 19, or, alternately, by cutting a cleaning member 17 to the desired length.

As will be understood by one skilled in the art, each component of the various embodiments of the present invention can be made or substantially made of multiple materials. Preferably materials for the mounting plate 1, positioning arms 3, support member 13, connecting member 15, and base member 19 include, by way of example, steel and steel alloys and aluminum and aluminum alloys. Further, as will be understood by one skilled in the art, the hydraulic drive 21 and related assembly to provide rotation of the brushes 5, as shown in FIGS. 7-9 and 13, can exist in a wide variety of specific configurations and use a variety of different specific parts. Further, as will be understood by one skilled in the art, electric, pneumatic, or other drive means may be used in placed of a hydraulic drive means within the scope and spirit of this invention.

The forgoing disclosure is illustrative of the present invention and is not to be construed as limiting thereof. Although one or more embodiments of the invention have been described, persons of ordinary skill in the art will readily appreciate that numerous modifications could be made without departing from the scope and spirit of the disclosed invention. As such, it should be understood that all such modifications are intended to be included within the scope of this invention. The written description illustrates the present invention and is not to be construed as limited to the specific embodiments disclosed.

What is claimed is:

1. A device for cleaning a pair of belt-like tracks of a vehicle wherein one of each of the tracks is located on one side of the vehicle and wherein each track includes a ground contacting surface having a plurality of ridges, said device comprising:
    a transversely extending mounting plate located between the tracks and mounted to the vehicle;
    a first positioning arm connected to and extending from said mounting plate;
    a pair of base members connected to said first positioning arm and extending in directions generally opposite each other;
    a pair of brushes, wherein one of each said brushes corresponds with each said base member respectively;
    a cleaning member attached to each brush; and,
    wherein said mounting plate, said first positioning arm, said base members and said brushes are configured such that, when said mounting plate is mounted to a pre-selected mounting point on the vehicle, one of each said cleaning members is substantially in contact with the ridges of one of the tracks of said vehicle.

2. The device of claim 1, further comprising a second positioning arm wherein said first and second positioning arms are adjustably connected to and extend from said mounting plate.

3. The device of claim 2, further comprising a connecting member attached to the first and second positioning arms.

4. The device of claim 3, further comprising at least one biasing member adapted to bias said first and second positioning arms downward.

5. The device of claim 4, wherein said vehicle is a bulldozer.

6. The device of claim 1 further comprising a connecting member attached to said first positioning arm and to each of said base members.

7. The device of claim 1, further comprising at least one biasing member adapted to bias said first positioning arm downward.

8. The device of claim 1, wherein said vehicle is a bulldozer.

9. The device of claim 1, further comprising a drive unit connected to said first positioning arm, said drive unit rotatably driving a pair of drive axles and wherein each drive axle is coupled to and rotatably drives each one of said base members respectively, whereby the brush and cleaning member of said base member are also rotatably driven.

10. The device of claim 9 comprising a plurality of cleaning members attached to and extending from each said base member.

11. The device of claim 9, further comprising a second positioning arm, wherein the first and second positioning arms are connected to and extend from said mounting plate.

12. The device of claim 9, wherein said vehicle is a bulldozer.

* * * * *

UNITED STATES PATENT AND TRADEMARK OFFICE
CERTIFICATE OF CORRECTION

PATENT NO. : 10,549,798 B2
APPLICATION NO. : 15/229453
DATED : February 4, 2020
INVENTOR(S) : Adam Carpenter Page 1 of 1

It is certified that error appears in the above-identified patent and that said Letters Patent is hereby corrected as shown below:

In the Specification

Column 1, Line 62, delete "in" and insert --to--

Column 2, Line 57, delete "composes" and insert --comprises--

Column 3, Line 56, delete "embodiment" and insert --embodiments--

Column 5, Line 3, delete "show" and insert --shown--

Column 5, Line 7, delete "of", second occurrence, and insert --or--

Column 5, Line 33, after "the", first occurrence, insert --drive--

Signed and Sealed this
Twenty-fourth Day of March, 2020

Andrei Iancu
*Director of the United States Patent and Trademark Office*